US006765358B1

(12) United States Patent
Noble et al.

(10) Patent No.: US 6,765,358 B1
(45) Date of Patent: Jul. 20, 2004

(54) ELECTRIC MOTOR

(75) Inventors: Ernest John Noble, Auckland (NZ); David James Howell, Auckland (NZ)

(73) Assignee: Wellington Drive Technologies Limited, Auckland (NZ)

( * ) Notice: Subject to any disclaimer, the term of this patent is extended or adjusted under 35 U.S.C. 154(b) by 0 days.

(21) Appl. No.: 10/130,059

(22) PCT Filed: Nov. 16, 2000

(86) PCT No.: PCT/NZ00/00230

§ 371 (c)(1),
(2), (4) Date: Sep. 13, 2002

(87) PCT Pub. No.: WO01/37418

PCT Pub. Date: May 25, 2001

(30) Foreign Application Priority Data

Nov. 16, 1999 (NZ) .................................................. 501086
Jan. 12, 2000 (NZ) .................................................. 502241

(51) Int. Cl.[7] ................................................ H02P 6/10
(52) U.S. Cl. ...................... 318/254; 318/720; 318/460; 318/702
(58) Field of Search ................................. 318/138, 254, 318/439, 720, 721, 722, 724, 459, 460, 702

(56) References Cited

U.S. PATENT DOCUMENTS

| 3,767,986 | A | * | 10/1973 | Wada .......................... 318/138 |
| 4,760,315 | A |   | 7/1988 | Nanae et al. |
| 5,041,774 | A |   | 8/1991 | Komatsu |
| 5,321,342 | A | * | 6/1994 | Kruse .......................... 318/254 |
| 5,600,218 | A | * | 2/1997 | Holling et al. .............. 318/439 |

FOREIGN PATENT DOCUMENTS

| JP | 0 729 8671 | 11/1995 |
| JP | 0 729 8676 | 11/1995 |
| JP | 11-225494 | 8/1999 |
| JP | 11-235087 | 8/1999 |

\* cited by examiner

Primary Examiner—Bentsu Ro
(74) Attorney, Agent, or Firm—Young & Thompson (57) ABSTRACT

A variable motor (1) having reduced audible noise. This advantage is achieved by reducing or eliminating ripple torque by making the individual phase torques follow a certain profile, so that when the torques are summed, they are substantially constant. Therefore, the motor (1) back EMF is used as a reference waveform to control the winding currents to achieve reduced ripple torque. The back EMF reference is amplified and provided to the motor windings, and may be derived in a number of ways including use of sense windings, electronic derivation, and approximation by sensing the voltage applied to the windings.

13 Claims, 5 Drawing Sheets

ELECTRIC MOTOR

FIELD OF THE INVENTION

This invention relates to electric motors in particular, but not exclusively to, variable speed brushless electric motors.

BACKGROUND ART

Variable speed electric motors are known prior art. In many motor applications audible noise is undesirable, and can become particularly noticeable at low motor speeds and when the electrical supply to such motors is varied during transitions from the original speed to the varied speed. Audible noise is also associated with energy loss. It is also known that speed variations of prior art motors are difficult to control because these motors are generally designed to operate at a fixed supply frequency. Speed control difficulties are most pronounced in prior art fractional and subfractional horsepower motors with designs which have been optimised or minimised for low manufacturing costs. It is however possible to improve the speed variation and control of these motors by electronic means. In addition mechanical means such as but not limited to gearboxes, belts, variators and electromagnetic couplings may also be incorporated to improve speed control. As a consequence, these improvements increase the cost and complexity of the complete motor assembly. Prior an motors have also been found to have energy efficiencies (defined as the ratio of mechanical output power to electrical input power) of 20% or less when operating at fixed speeds. The addition of speed control means reduces the energy efficiency still further.

OBJECT OF THE INVENTION

It is one object of the present invention to provide a variable speed electric motor which is more efficient or audibly quieter at least when varying speeds, or to at least provide the public with a useful choice.

SUMMARY OF THE INVENTION

According to one aspect the invention provides an electric motor including means for determining a first signal associated with the rotor (when the motor is operational) and wherein said first signal is applied as an input signal to a power amplifier, which generates an output which is applied to windings of the motor to drive the motor, and whereby in use, audible noise associated with the motor is thus significantly reduced.

The invention may make use of a sense winding as described in our earlier New Zealand Patent application 501086 (the contents of which are incorporated herein by way of reference) to determine the first signal, or it may simulate this signal electronically without the need for a sense winding. As a further alternative the invention may derive an approximation of the first signal by sensing the voltage or current applied to the windings. In either case the first signal is applied to a power amplifier to create an output which is applied to the motor to drive the motor.

According to a second aspect the invention provides an electric motor including electronic back EMF sensing means, the electronic back EMF sensing means including voltage sensing means and current sensing means and rate-of-change of current sensing means adapted to sense a back EMF generated by a rotor of the motor wherein the sensed electronic back EMF is applied as an input signal to a power amplifier, which generates an output which is applied to windings of the motor as a drive voltage or current, and whereby in use, audible noise associated with the motor is thus significantly reduced.

According to a third aspect the invention provides an electric motor including sensing means to sense an approximation of the back EMF produced by rotation of the rotor by sensing the voltage or current applied to a motor winding, the sensing means providing a first signal which is applied as an input signal to a power amplifier, which generates an output which is applied to windings of the motor as a drive voltage or current, and whereby in use, audible noise associated with the motor is thus significantly reduced.

According to a fourth aspect the invention provides an electric motor including back EMF prediction means, the back EMF prediction means including a memory from which data relating to the motor are stored, the back EMF prediction means providing a first signal indicative of the motor back EMF, the first signal being applied as an input signal to a power amplifier, which generates an output which is applied to windings of the motor as a drive voltage or current, and whereby in use, audible noise associated with the motor is thus significantly reduced.

Preferably the electric motor is a radial flux permanent magnet motor. In the alternative the electric motor can be an axial flux motor or other type of direct current motor.

Preferably the motor is a brushless motor.

Preferably the rotor is an external rotor rotatable about a central shaft.

Preferably the rotor houses a plurality of spaced permanent magnets arranged in a radial pattern on an internal surface of the rotor.

Preferably the electronic back EMF sensing means includes current sensing means which detect the steady state value of the motor winding current in each motor phase.

Preferably the electronic back EMF sensing means also includes rate-of-change of current sensing means which detect the rate-of-change of motor winding current in each phase.

Preferably the electronic back EMF sensing means also includes voltage-sensing means which sense the voltage applied to the motor windings.

Preferably the electronic back EMF sensing means also includes a summing amplifier which allows the addition of signals from the current sensing means and the rate-of-change of current sensing means and the voltage sensing means, so that the output of the summing amplifier is analogous to the voltage field generated by the rotor of the motor.

Preferably the electronic back EMF sensing means also includes filtering circuits that can introduce a phase shift between the summing amplifier input voltages and the summing amplifier output voltage which is then applied to the power amplifier input.

Preferably the power amplifier means comprises power conversion means to adjust an available supply voltage to voltage levels suitable for driving the motor at the required speed controlled either directly or indirectly by the electronic back EMF sensing means.

In another aspect the invention resides in a method of reducing audible noise associated with an electric motor including the steps of:
1. Sensing a first signal associated with the voltage generated by a motor's rotor from rotation of the rotor in use.
2. Amplifying and applying directly the first signal to windings of the motor as a drive voltage or current.
3. Controlling the drive voltage or current amplitude to control the motor whereby in operation audible noise is significantly reduced.

Preferably the electric motor is a radial flux permanent magnet motor. In the alternative the electric motor can be an axial flux motor or other type of direct current motor.

Preferably the motor is a brushless motor.

Preferably the rotor is an external rotor rotatable about a central shaft.

Preferably the rotor houses a plurality of spaced permanent magnets arranged in a radial pattern on an internal surface of the rotor.

Preferably the search coil means comprises a coil or coils wound coincidentally with one or more of the drive windings of the motor.

Preferably the electronic field sensing means includes a power amplifier that amplifies the search coil voltage. Preferably the electronic field sensing means also includes filtering circuits that can introduce a phase shift between the search coil voltage and the power amplifier output voltage which is then applied to the motor windings.

Preferably the power amplifier means comprises power conversion means to adjust an available supply voltage to voltage levels suitable for driving the motor at the required speed controlled either directly or indirectly by the electronic field sensing means.

In another aspect the invention resides in a method of reducing audible noise associated with an electric motor including the steps of:

1. Sensing, approximating or predicting a voltage or current generated by a motor's rotor.
2. amplifying and applying directly the generated voltage or current to windings of the motor as a drive voltage or current,
3. controlling the drive voltage or current amplitude to control the motor whereby in operation audible noise is significantly reduced.

BRIEF DESCRIPTION OF THE DRAWINGS

In order that the present invention can be more readily understood and put into practical effect, reference is made to the accompanying drawings of the preferred embodiments wherein.

DETAILED DESCRIPTION OF EXAMPLES OF THE INVENTION

The invention achieves reduced acoustic noise (and thus also preferably reduces energy losses) by reducing or substantially eliminating ripple torque. This can be achieved by making the individual phase torques follow a certain profile, so that when the torques are summed, they are substantially constant. For example, in a 2 phase motor with 90 degree displacement between windings, zero ripple torque is generated when the individual phase torques follow a $\sin^2(\theta e)$ profile, where $\theta e$ is the angular position of the rotor magnetic field.

Where the motor is designed so that the rotor flux linkage with the windings is a sinusoidal function of $\theta e$, and the winding currents are also sinusoidal function of $\theta e$, then the torque contribution for a single phase is proportional to $\sin^2(\theta e)$. Thus, again in the example of a two phase motor, when there is sinusoidal winding flux linkage and 90 degree phase displacement between windings there is zero ripple torque if the instantaneous winding currents are in proportion to the instantaneous flux linkage in each phase.

The motor back EMF is proportional to the flux linkage. Therefore, the invention embodies use of the motor back EMF as a reference waveform to control the winding currents.

EXAMPLE 1

Figure 1:
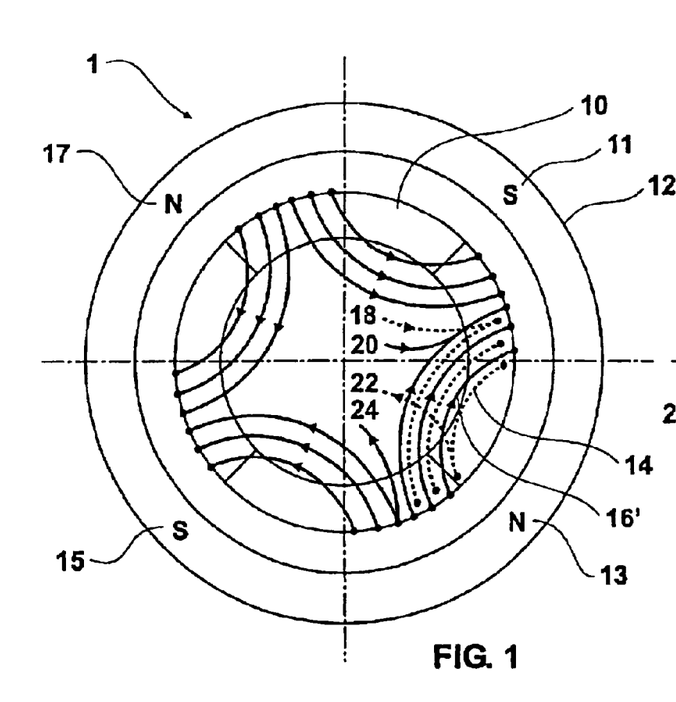
FIG. 1: is a plan view of a rotor and stator of a preferred motor according to Example 1.

FIG. 1 of Example 1 depicts a plan view of a preferred external rotor 4 pole 2 phase brushless dc motor (1). Alternatively the number of motor poles may be any even number in the range 2–40. Alternatively the number of motor phases may be any number in the range 1–12. An 8 slot stator assembly (10) is located concentric to a rotor assembly (12) The rotor assembly has 4 magnetic poles (11, 13, 15, 17) arranged radially on the internal surface of the rotor.

The drawing shows the location of an A phase search coil (14) and the A phase main winding (16). The search coil consists of 20 turns spanning a single stator pole (not shown). The main winding consists of 40 turns per pole spanning 4 stator poles (not shown). The full number of turns are not shown on the drawing for reasons of clarity, however the conductor paths are clearly shown. The winding start and end points are labelled as follows:

(i) A-phase search coil start (18);

(ii) A-phase search coil end (22);

(iii) A-phase main winding start (20);

(iv) A-phase main winding end (24).

EXAMPLE 2

In this example, like parts are given the same numbering as these of FIG. 1

Figure 2:
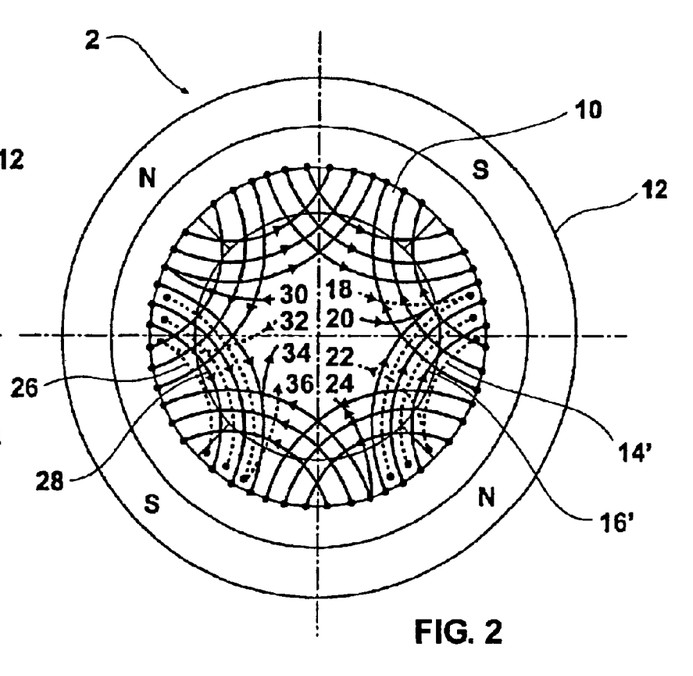
FIG. 2: is a plan view of a rotor and stator of a preferred motor according to Example 2.

FIG. 2 of Example 2 depicts a plan view of a preferred external rotor 4 pole 2 phase brushless dc motor (2). The stator (10) and rotor (12) assembly showing in addition to FIG. 1, the location of the B phase search coil (26) and the B-phase main winding (28). The B phase winding start and end points are labelled as follows:

(i) B-phase search coil start (32);

(ii) B-phase search coil end (36);

(iii) B-phase main winding start (30);

(iv) B-phase main winding end (34).

Figure 3:
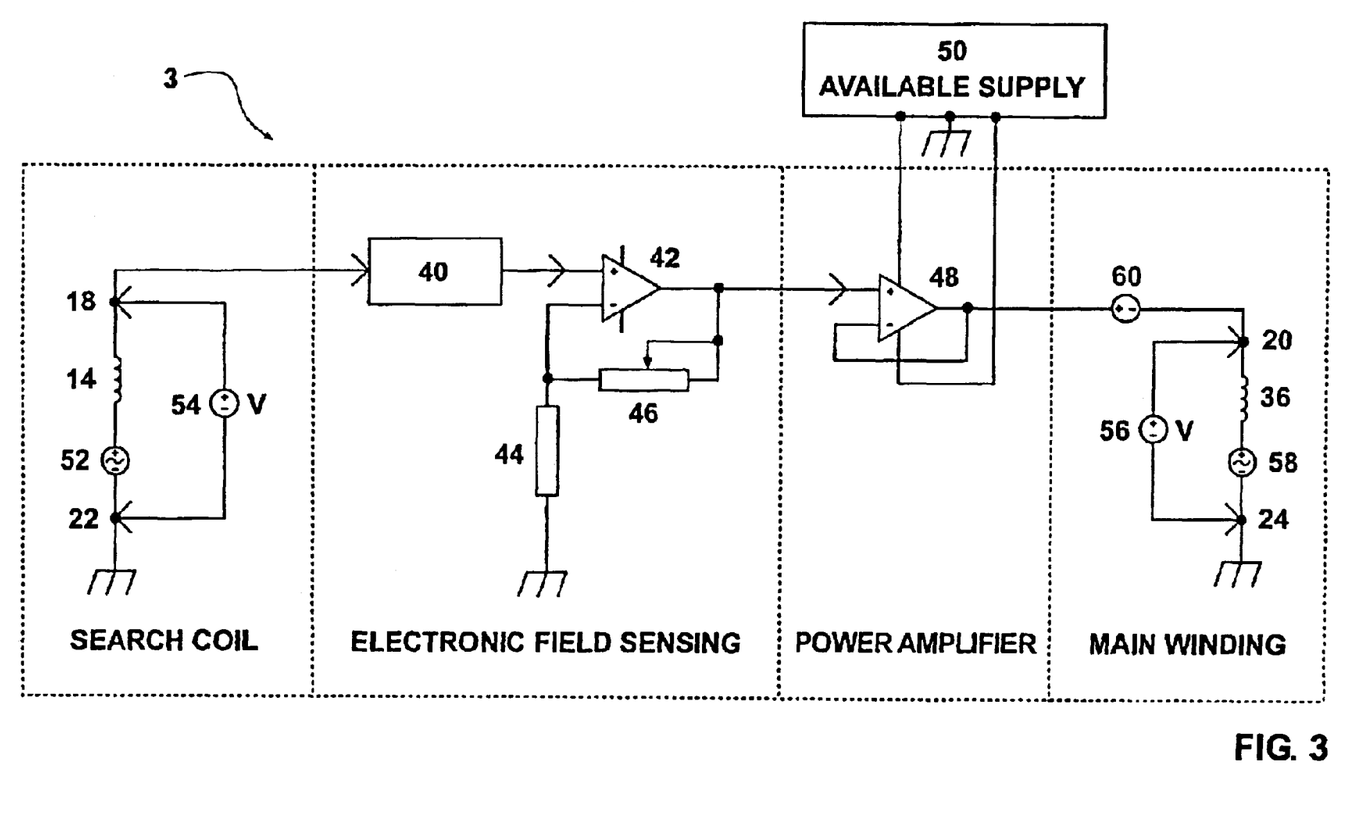
FIG. 3: shows a schematic diagram representing a preferred circuit arrangement of the invention.

FIG. 3:

Shows a schematic diagram (3) of the circuit of the preferred embodiment of the electronic field sensing means and power amplifier means. Vsearch (52) represents the electro motive force (emf) induced in the search coils (not shown) as the rotor magnetic field moves over them. The magnitude of Vsearch is proportional to the rotor revolution per minute (rpm) and has a voltage coefficient, Kvs, of 1V/1000 rpm. Vs (54) represents the voltage measured between (18) and (22). The electronic field sensing circuit is designed to present negligible electrical load to the search coil, so that Vs and Vsearch can be regarded as equivalent.

Vbemf (58) represents the emf induced in the main windings (not shown) as the rotor magnetic field moves over them. The magnitude of Vbemf is proportional to the rotor rpm and has a voltage coefficient, Kvm, of 8V/1000 rpm. Vapp (56) represents the voltage measured between (20) and (24). Iw (60) represents the current flowing in the main winding (not shown). If no current is flowing in the motor winding i.e. Iw=0, then Vapp=Vbemf. For any non-zero value of Iw, Vapp and Vbemf will differ due to internal voltage drop within the main winding.

Vs is passed through a filter stage (40) to remove spurious noise and introduce a phase shift if required. The filter output signal is passed through a voltage amplifier A1 (42) and then into a power amplifier A2 (48). The power amplifier draws electrical power from an available supply (50) and applies the amplified search coil voltage, Vapp, to the main winding. The overall voltage gain, Av, of amplifiers A1 (42) and A2 (48) operating in series can be defined as the ratio of Vapp divided by Vs.

In order to generate motoring torque in the motor, the magnitude of Vapp must be greater than vbemf In order to achieve this Av must be greater than Kvm divided by Kvs i.e. for the windings shown Av must be greater than 8.

Alternatively, if Av is set so that Vapp is lower than Vbemf, then Iw will flow in the reverse direction and the motor will generate a braking torque. Thus, the magnitude and direction of motor output torque generated at a given rpm is determined by the value of Av.

In the embodiment shown, all of the system voltage gain is implemented in amplifier A1. Amplifier A2 is a unity gain voltage follower, which provides current amplification to supply the stator winding. Alternatively, amplifiers A1 and A2 may be implemented in a single integrated amplifying device, such as an amplifier integrated circuit.

In the embodiment shown, the voltage gain of A1 is set by the value of variable resistor VR1 (46), divided by resistor R1 (44). Therefore, adjusting the value of VR1 varies Av, which controls the magnitude and direction of motor torque at a given rpm. Alternatively Av may be varied by use of an electronic gain control circuit (not shown). Alternatively, Av may be constant and Vapp controlled by means of variable attenuation of Vs. Alternatively, any circuit means which allows variation of Av as defined above may be employed.

EXAMPLE 4

Figure 4:
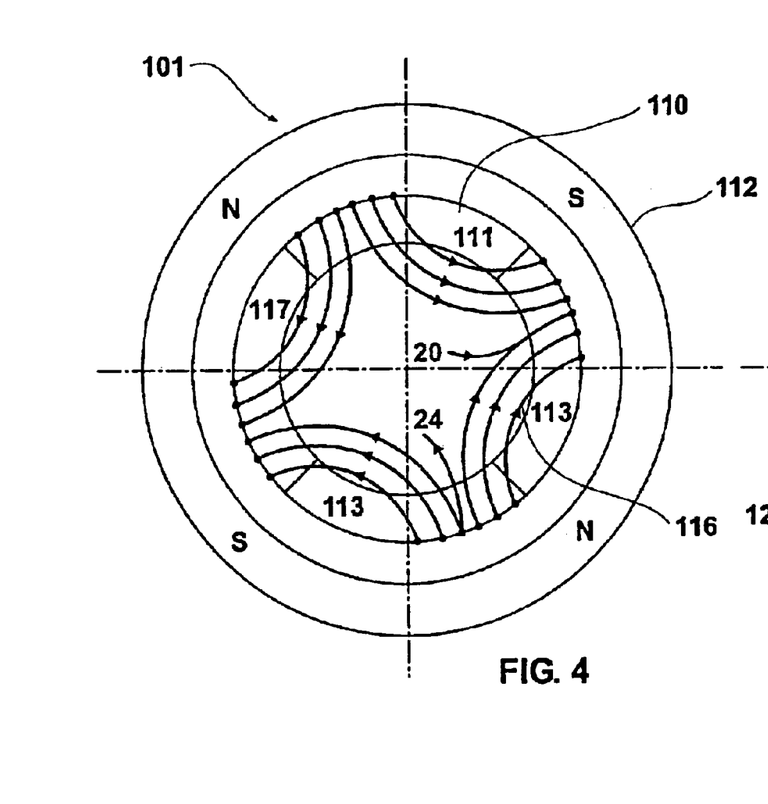
FIG. 4: is a plan view of a rotor and stator of a preferred motor according to Example 4.

FIG. 4 of Example 4 depicts a plan view of a preferred external rotor 4-pole 2-phase brushless dc motor (101).

Alternatively the number of motor poles may be any even number in the range 2–40. Alternatively the number of motor phases may be any number in the range 1–12.

An 8-slot stator assembly (110) is located concentric to a rotor assembly (112). The rotor assembly has 4 magnetic poles (111, 113, 115, 117) arranged radially on the internal surface of the rotor.

The drawing shows the location of the A phase main winding (116). The main winding consists of 40 turns per pole spanning 4 stator poles (not shown). The full number of turns are not shown on the drawing for reasons of clarity, however the conductor paths are clearly shown. The winding start and end points are labelled as follows:

(i) A-phase main winding start (120);

(ii) A-phase main winding end (124).

EXAMPLE 5

In this example, like parts are given the same numbering as these of FIG. 4.

Figure 5:
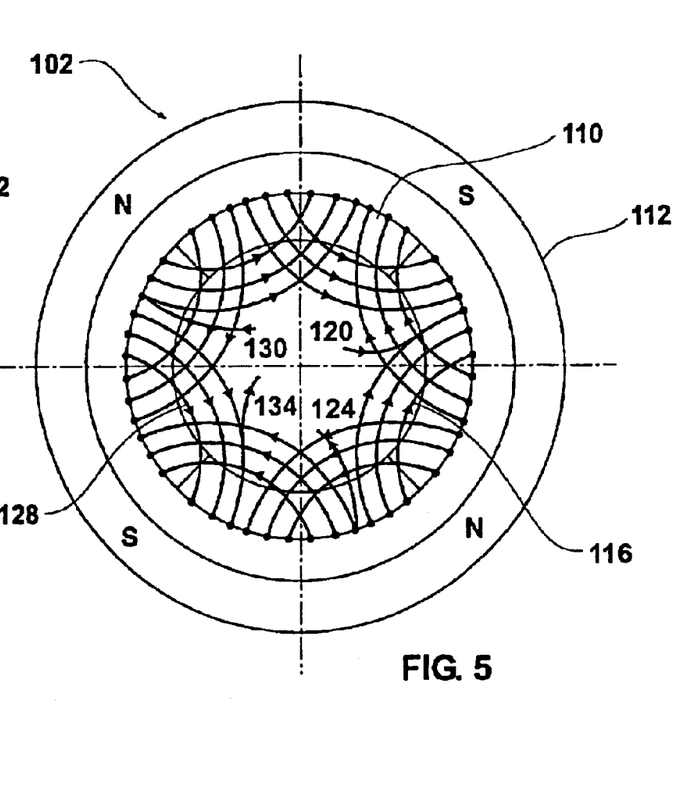
FIG. 5: is a plan view of a rotor and stator of a preferred motor according to Example 5.

FIG. 5 of Example 5 depicts a plan view of a preferred external rotor 4-pole 2-phase brushless dc motor (102). The stator (110) and rotor (112) assembly showing in addition to FIG. 1, the location of the B-phase main winding (128). The B phase winding start and end points are labelled as follows:

(i) B-phase main winding start (130);

(ii) B-phase main winding end (134).

EXAMPLE 6

Figure 6:
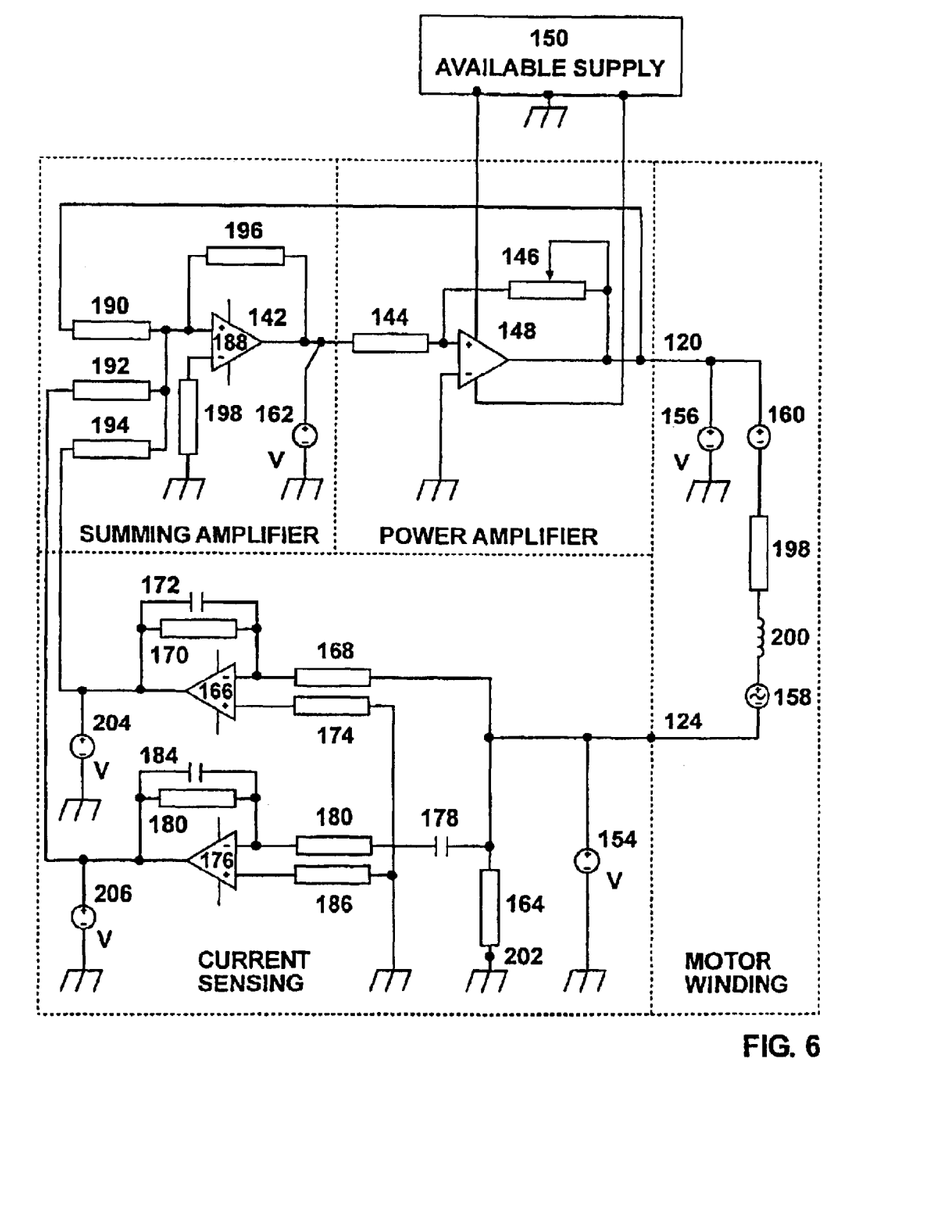
FIG. 6: shows a schematic diagram representing a preferred circuit arrangement of the invention.

FIG. 6 shows a schematic diagram of the circuit of the preferred embodiment of the electronic back EMF sensing means and power amplifier means.

Vbemf (158) represents the EMF induced in the main windings (not shown) as the rotor magnetic field moves over them. The magnitude of Vbemf is proportional to the rotor rpm and has a voltage coefficient, Kvm, of 8V/1000 rpm. Rw (198) represents the resistance of the motor winding, measured between terminals (120) and (124). Lw (200) represents the inductance of the motor windings measured between terminals (120) and (124). Vapp (156) represents the voltage applied to the motor windings measured between (120) and (202). Iw (160) represents the current flowing in the main winding (not shown). If no current is flowing in the motor winding i.e. Iw=0, then Vapp=Vbemf. For any non-zero value of Iw, Vapp and Vbemf will differ due to internal voltage drop within the main winding.

Electric current flowing in the motor winding generates a voltage, Vs (154), across a current sensing resistor, Rs (164). Rs is chosen to be significantly lower resistance than Rw (Rs<0.1Rw) so that negligible error is incurred in considering Vapp to be equivalent to the voltage measured between (120) and (124). Vs is connected to the input of current detection circuit comprising amplifier A1(166) and associated components R168 (168), R170 (170), R174 (174), C172 (172). The voltage gain, Av1, of amplifier A1 is set so that:

Rs multiplied by Av1=Rw,
so that A1 output voltage, VRw(204) is equal in magnitude to the voltage drop across Rw due to Iw.

A1 is an inverting amplifier, so VRw=−(Rw×Iw).

Av1 is equal to the ratio of R170 divided by R168 and this ratio must thus be equal to Rw divided by Rs.

Capacitor C172 is selected to reduce Av1 at frequencies above the maximum motor operating frequency.

R174 is chosen to be the standard resistor value closest to the value of R168 and R170 in parallel combination, according to standard design practise.

Vs is also connected to the input of the rate-of-change of current detection circuit comprising amplifier A2 (176) and associated components C178 (178), C184 (184), R180 (180), R182 (182), R186 (186). C178 and R182 are chosen so that A2 output voltage, VLw (206) is equal in magnitude to the rate-of-change of Iw through Rs multiplied by Lw. A2 is an inverting amplifier, so VLw=−(Lw×d(Iw)/dt).

R180 and C184 are added to limit the response of the circuit to noise at frequencies above the maximum motor operating frequency, according to standard design practise.

A3 (188) forms a summing amplifier, where Vapp, VRw and VLw are added to form a composite voltage signal Vbemf* (162).

Resistors R190, R192, R194 and R196 allow the relative weighting of Vapp, VRw and VLw to be scaled if required.

The output of A3 is described by the equation; Vbemf*=−(Vapp−VRw−VLw).

By comparison it can be seen that this is analogous to the actual motor back emf voltage, which is described by the equation Vbemf=(Vapp−(Iw×Rw)−(Lw×d(Iw)/dt)).

Vbemf* is applied to the input of power amplifier A4 (148).

The system voltage gain, Avs, can be defined as the ratio of Vapp divided by Vbemf. The voltage gain of A4 can be defined as the ratio of Vapp divided by Vbemf*. The power amplifier draws electrical power from an available supply (150) and applies an output voltage, Vapp, proportional to Vbemf*, to the main winding. In order to generate motoring torque in the motor, the amplitude of Vapp must be greater than Vbemf. In order to achieve this Avs must be greater than unity, or where Vbemf* is scaled so as to be equal in magnitude to Vbemf, then Av4 must be greater than unity.

Alternatively, if Avs is set so that Vapp is lower than Vbemf, then Iw will flow in the reverse direction and the motor will generate a braking torque. Thus, the magnitude and direction of motor output torque generated at a given rpm is determined by the value of Avs.

In the embodiment shown, the electronic back emf sensing circuit output, Vbemf*, is equal in magnitude to the motor back emf, Vbemf and all of the system voltage and current gain is implemented in power amplifier A4, so that Av4 is equivalent to Avs. Alternatively any combination of voltage and current amplification stages may be employed.

In the embodiment shown, Av4 is set by the value of variable resistor VR1 (146), divided by resistor R1 (144). Therefore, adjusting the value of VR1 varies Avs, which controls the magnitude and direction of motor torque at a given rpm. Alternatively Avs may be varied by use of an electronic gain control circuit (not shown). Alternatively, Avs may be constant and Vapp controlled by means of variable attenuation of Vbemf*. Alternatively, any circuit means which allows variation of Avs as defined above may be employed.

EXAMPLE 7

Figure 7:
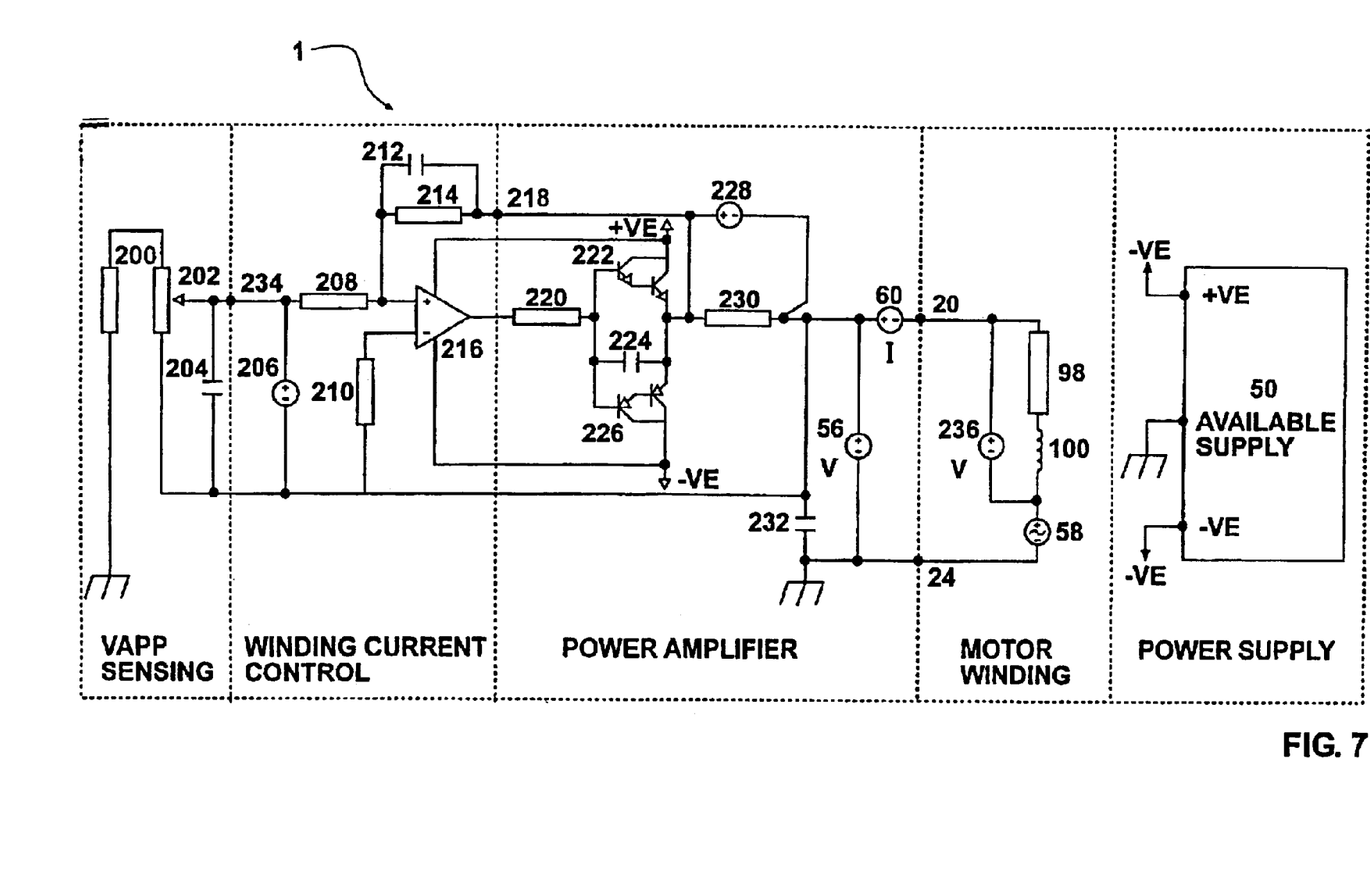
FIG. 7: shows a schematic diagram representing a further preferred circuit arrangement of the invention.

FIG. 7 shows a schematic diagram (1) of the circuit of the preferred embodiment of the electronic applied voltage sensing means and power amplifier means.

Vbemf (58) represents the emf induced in the main windings (not shown) as the rotor magnetic field moves over them. The peak magnitude of Vbemf is proportional to the rotor rpm and has a voltage coefficient, Kvm, of 8V/1000 rpm. Vbemf is an alternating current waveform, with frequency, fcom, proportional to rpm and number of motor magnetic poles as described by equation; fcom (Hz)=rpm/60×(number of motor poles)/2.

Rw (98) represents the distributed resistance of the motor winding, measured between terminals (20) and (24). Lw (100) represents the distributed inductance of the motor windings measured between terminals (20) and (24) Xw (not shown) represents the reactance of Lw at fcom, as described by equation, Xw=2π×fcom×Lw. Zw (not shown) represents the combined ac impedance of Rw and Xw at fcom, as described by equation; $Zw=\sqrt{(Rw^2+Xw^2)}$.

Vapp (56) represents the voltage measured between (20) and (24). Iw (60) represents the current flowing in the main winding (not shown). Vw (236) represents the voltage drop across Zw due to Iw. Vw is internal to the motor and cannot be directly measured by physical means. Vw can be calculated from equation; Vw=Zw×Iw. Vapp can also be calculated from equation; Vapp=Vbemf+(Iw×Zw).

Vapp is filtered and attenuated by the Vapp sensing circuit comprising components R200 (200), VR202 (202), C204 (204). KVapp(206) represents the voltage measured between (234) and (20), which is inverted in polarity with respect to Vapp. R200 and VR202 form a potential divider which attenuates Vapp by a fraction K, so that KVapp=−K×Vapp, where K can be altered by changing the setting of VR202. C204 provides filtering of the KVapp signal to remove spurious circuit noise and introduce a phase delay between KVapp and Vapp.

KVapp is connected to the input of the winding current control circuit comprising amplifier A216 (216) and associated components R208 (208), R210 (210), 214 (214), C212 (212). A216 output is connected to the input of a power amplifier circuit comprising T222 (222), T224 (226), R220 (220), R230 (230), C224 (224), C232 (232). The power amplifier draws power from an available supply (50) and applies power to the motor winding.

Vs (228) represents voltage measured between (218) and (20). Vs is equal to the voltage drop across R230 due to current flowing in the motor windings, i.e. Vs=Iw×R230. A216 is configured as an inverting amplifier, with voltage gain, Av equal to the ratio of R208 and R214; i.e. Av=−(R214/R208). Negative voltage feedback is provided by connecting feedback network R214, C212 to Vs. C212 is selected to reduce Av at frequencies above maximum fcom. R210 is chosen to be a standard resistor value close to the value R208 and R214 in parallel combination, according to standard design practise. C232 provides energy absorption to limit the rate-of-rise of voltage Vapp.

As Vs is proportional to Iw, the winding current control circuit and power amplifier circuit acting in series form a transconductance amplifier where the output current, Iw, is proportional to the input voltage, KVapp. For a given setting of VR202 KVapp is proportional to Vapp so the transconductance amplifier varies Iw in proportion to Vapp. The magnitude of Iw is controlled by altering the setting of VR202. The ratio of Iw to Vapp can be defined as the system transconductance Gs (not shown), described by equation Gs=Iw/Vapp.

The relationship between Vapp, Vbemf, Iw and Zw is described by the characteristic equation for a dc machine; Vapp=(Iw×Zw)+Vbemf By substituting (Gs×Vapp) for Iw, and rearranging it can be shown that:

$$Vapp=Vbemf \times (I-Gs \times Zw)^{-1}$$

So, since Vapp is proportional to Vbemf, and Iw is proportional to Vapp, it follows that for the control system described above Iw is proportional to Vbemf for a given Gs.

In the embodiment shown the transconductance amplifier has fixed gain and Gs is varied via VR202. Alternatively Gs may be varied by altering the gain of the transconductance amplifier. Alternatively Gs may be varied by the inclusion of additional attenuation networks (not shown). Alternatively Gs may be varied by the use of an electronic gain control circuit (not shown). Alternatively, any circuit means which allows variation of Gs as defined above may be employed.

In the embodiment shown, a transconductance amplifier is formed by a winding current control stage in series with a power amplifier stage. Alternatively, a transconductance amplifier comprising any combination of signal and power amplification stages may be employed.

In the embodiment shown the circuit is configured so that when Vbemf is positive, positive current flows from the power amplifier into the motor winding. Under these conditions the motor generates positive or motoring torque. Alternatively, the circuit may be reconfiguration so that when Vbemf is positive, current flows from the motor winding into the power amplifier and the motor will generate braking torque.

In summary, it will be seen that the invention allows the voltage applied to the motor windings to be sensed, and from this an approximation of the back EMF is obtained and this is amplified and provided to provide the appropriate current to the motor windings. It will also be seen that a transresistance amplifier configuration may also be employed. Therefore, the winding current may be sensed and used to provide a signal that has a relationship to the back EMF, and then this may be amplified to provide a voltage output to the motor which is modulated in proportion to the winding current. With the correct choice of control circuit parameters the winding current can be made to track the back EMF with a small phase delay.

It will also be apparent to one skilled in the art that digital forms of waveform estimation, determination and prediction may be used according to the invention. Thus, from knowing the back EMF waveform characteristic for a given motor, it is possible to store waveform information in the memory of a microprocessor and from this generate desired waveforms in real time. Also, a microprocessor may implement the calculations required to predict the back EMF ie to implement the analog determination of the back EMF set forth in example 6 above.

Furthermore, the sensed signals indicative of back EMF may be provided to an amplifier having adjustable gain, which actively controls the current or voltage applied to the motor winding.

ADVANTAGES

The advantages of the present invention have been already mentioned and are principally that changes in speed of a brushless d.c. motor can be effected with low audible noise and energy wastage. In addition the advantages include the use of readily available components to achieve this end without resorting to expensive electronic and mechanical means to improve speed variability and control.

Although the advantages presently benefit brushless d.c. motors of the external rotor design, it is envisaged that the same advantages can benefit motors of other designs by adaptation and modification of the present invention by those skilled in the art.

VARIATIONS

Different pole or phase numbers may be used—although this invention is best suited to small (less than 100 watt) variable speed brushless DC motors. In the example the motor is a 4-pole 2-phase external rotor radial flux motor—although other configurations may be used. By using our design of radial flux motor (for example using soft iron wire or tape wound as a thin layer on the stator below the stator windings described in patent specifications published under our earlier company names Cadac Holdings Ltd or Cadac Ltd) it is possible to make a low inductance motor particularly suited to this control technique.

If a sense winding is used a current amplifier may be used in place of the voltage amplifier described in the examples.

Finally it will be appreciated that various other alterations and modifications may be made to the foregoing without departing from the scope of this invention as set forth.

Throughout the description and claims of this specification the word "comprise" and variations of that word, such as "comprises" and "comprising", are not intended to exclude other additives, components, integers or steps.

What is claimed is:

1. An electric motor including an electronic back EMF sensing means, the electronic back EMF sensing means including a voltage sensing means and a current sensing means and a rate-of-change of current sensing means adapted to sense a back EMF generated by a rotor of the motor, wherein output signals from the three sensing means are applied as input signals to a summing amplifier so that an output signal of the summing amplifier is analogous to a voltage field generated by the rotor of the motor and the output signal of the summing amplifier is applied to a power amplifier, which power amplifier generates an output which is applied to windings of the motor as a drive voltage or current, and whereby in use, audible noise associated with the motor is thus reduced.

2. An electric motor as claimed in claim 1, wherein the electronic back EMF sensing means also includes filtering circuits that can introduce a phase shift between the summing amplifier input voltages and the summing amplifier output voltage which is then applied to the power amplifier input.

3. An electric motor as claimed in claim 2, wherein the power amplifier comprises power conversion means to adjust an available supply voltage to voltage levels suitable for driving the motor at the required speed, controlled either directly of indirectly by the sensing means or the electronic back EMF sensing means.

4. An electric motor as claimed in claim 1, wherein the current sensing means detects the steady state value of the motor current in each motor phase.

5. An electric motor as claimed in claim 1, wherein the rate-of-change of current sensing means detects the rate-of-change of motor winding current in each phase.

6. An electric motor as claimed in claim 1, wherein the voltage-sensing means senses voltage applied to the motor windings.

7. An electric motor as claimed in claim 1, wherein the voltage-sensing means senses voltage applied to the motor windings.

8. A method of controlling the signals applied to an electric motor as a drive voltage or current including the steps of:

sensing the steady state current in each motor phase;

sensing the rate-of-change of current in each motor phase;

sensing the voltage applied to the motor windings;

applying the sensed signals to a summing amplifier so that the output of the summing amplifier is analogous to the voltage field generated by the rotor of the motor;

applying the output of the summing amplifier to a power amplifier; and applying the output of the power amplifier to the windings of the motor to maintain motor torque and reduce audible noise associated with the motor.

9. An electric motor, comprising:

a rotor; and an electronic back EMF sensing means, the electronic back EMF sensing means including
a summing amplifier,
a power amplifier,
a voltage sensing means,
a current sensing means, and
a rate-of-change of current sensing means connected to sense a back EMF generated by the rotor,
output signals from the three sensing means connected as input signals to the summing amplifier so that an output signal of the summing amplifier is analogous to a voltage field generated by the rotor of the motor,
the output signal of the summing amplifier connected to the power amplifier, and
an output signal of the power amplifier applied to windings of the motor as a drive voltage or current.

10. An electric motor as claimed in claim 9, wherein, the electronic back EMF sensing means further comprises filtering circuits to introduce a phase shift between input voltages and an output voltage of the summing amplifier.

11. An electric motor as claimed in claim 10, wherein the power amplifier comprises power conversion means to adjust an available supply voltage to voltage levels suitable for driving the motor at the required speed.

12. An electric motor as claimed in claim 9, wherein the current sensing means detects a steady state value of motor current in each motor phase.

13. An electric motor as claimed in claim 9, wherein the rate-of-change of current sensing means detects the rate-of-change of motor winding current in each phase.

* * * * *